Nov. 18, 1947.  W. S. ERWIN  2,431,233
SUPERSONIC MEASURING MEANS
Filed April 21, 1944   2 Sheets-Sheet 1

INVENTORS
Wesley S. Erwin
BY
Blackmor, Sawyer & Hint
ATTORNEYS

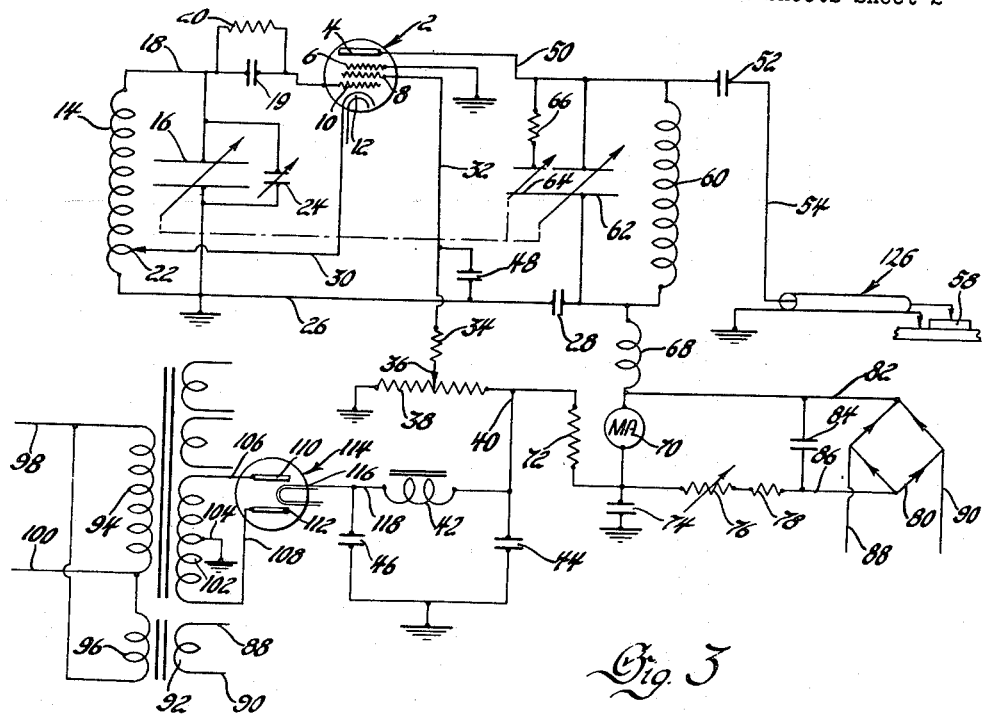

Patented Nov. 18, 1947

2,431,233

UNITED STATES PATENT OFFICE 2,431,233

SUPERSONIC MEASURING MEANS

Wesley S. Erwin, Detroit, Mich., assignor to General Motors Corporation, Detroit, Mich., a corporation of Delaware Application April 21, 1944, Serial No. 532,199

11 Claims. (Cl. 73—67)

This invention relates to means useful for measuring, gauging, sorting or structural study by the use of a variation in the electrical characteristics of a member. It relates more specifically to means using a crystal which is mechanically coupled to a part being investigated, the electrical characteristics of said crystal being utilized in the system to provide indications of the various conditions.

There are, of course, many instances in which it is desirable to determine the thickness of the walls forming a hollow member after the same has been completely fabricated or manufactured, and it is impossible to have access to the inside surface. As an example of this it might be very desirous to ascertain the thickness of a wall of a hollow body after the same wall has been fixedly secured thereto and after some machining has been done to finish the outside surface. In many instances these surfaces are ground away in order to provide the proper contour or smooth surface to too great an extent to maintain the proper strength of the material. A specific problem in this regard that might be cited is a modern propeller blade which is fabricated by applying to a concave casting or forging a sheet of metal which is welded thereto around its edges and thereafter its outer surface is ground and finished to specifications. As is well-known, the stress applied to the propellers is very high and they must be carefully inspected for thickness of this sheet when finished before they are approved. This, therefore, would be one instance in which it is absolutely necessary to have some means for gauging the thickness of this applied sheet in the finished propeller.

It is also often necessary to provide means for measuring the bond between pieces which are secured together over substantial areas and in the same category to be able to indicate or ascertain material soundness or continuity of materials and by doing so classify or sort the members being tested.

It is therefore an object of my invention to provide testing means applicable to materials in which only one surface is available.

It is a still further object of my invention to provide testing means for thin materials operating by the use of supersonic waves.

It is a still further object of my invention to provide gauging means operated on the principle of setting up standing waves which resonate in the body, thus determining the resonant wave length and the proportional thicknesses.

It is a still further object of my invention to provide measuring means operating on the principle of measuring the variation in electrical characteristics of a transducer due to mechanical loading thereof.

It is a still further object of my invention to provide measuring means operated on the principle of measuring electrically the mechanical loading on a piezoelectric crystal powered by an adjustable frequency oscillator.

It is a still further object of my invention to provide measuring or testing means which is small, portable and extremely easy to operate.

With these and other objects in view, which will become apparent as the specification proceeds, the embodiments of my invention are best understood by reference to the following specification and claims and the illustrations in the accompanying drawings, in which:

Figure 3 is a schematic wiring diagram of the system incorporating my invention, and Figures 4 and 5 are wiring diagrams of a portion of the apparatus showing modified forms of connecting the indicating meter into the circuit.

Figures 1, 2:
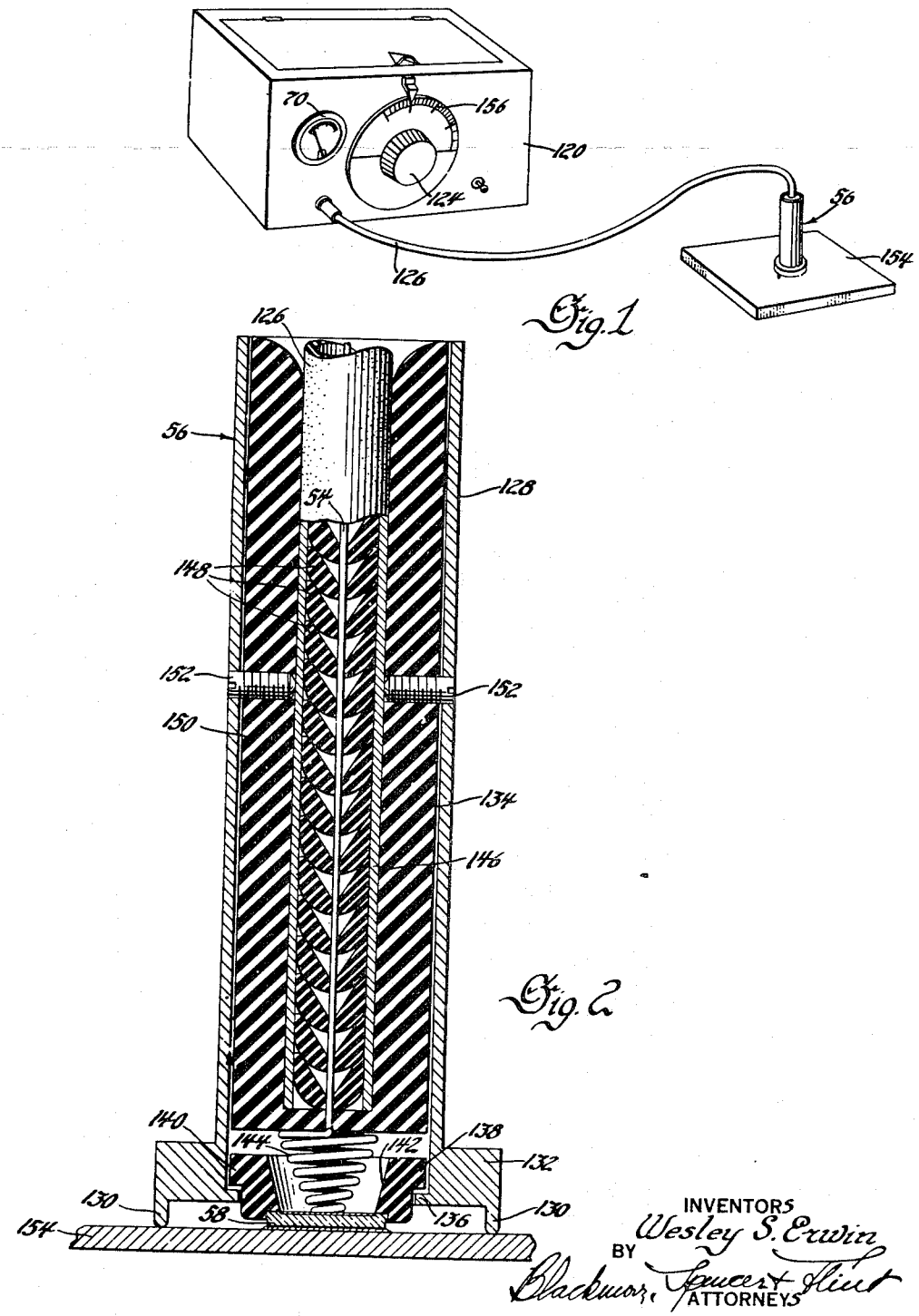
Figure 1 is a perspective view showing the apparatus of my invention.
Figure 2 is an enlarged sectional view taken through the means supporting the loaded part, in this instance a piezoelectric crystal.

Referring now more specifically to Figure 3 of the drawings, there is shown therein an electron oscillator tube indicated generally at 2, which has a plurality of electrodes therein, namely, a plate 4, a suppressor grid 6, a screen grid 8, a control grid 10, and a cathode 12. A main inductance 14 across which is connected a variable condenser 16 forms the main tunable circuit for the input of the oscillator tube 2, and, as shown, is connected through line 18, condenser 19, and grid leak 20 to the control grid 10 of said tube. The inductance coil 14 is provided with an adjustable tap 22 for cathode feedback. A trimmer condenser 24 is also connected in parallel with the main tuning condenser 16 to permit alignment of the two tuned circuits to the same frequency.

One side of the main tuning condenser 16, one side of the trimmer 24, and one side of inductance coil 14 is grounded. Tap 22 of the same coil is connected through line 30 to the cathode 12 of tube 2. Grid 8 is connected through line 32 to a resistor 34 and thence to a variable tap 36 on resistance member 38, one terminal of which is grounded and the opposite terminal is connected through line 40 to a choke coil 42 and filter condenser 44 which in combination with a second filter condenser 46 form a filter circuit between the resistor 38 and the voltage supply. Condenser 48 is connected between line 32 and the line 26.

Plate 4 of the tube 2 is connected through line 50 to a blocking condenser 52 and thence through the shielded cable 126 by line 54 to the crystal 58 which is seated on the work. The cable shield 126 is grounded as is the crystal holder and work through contact with the shield. An inductance coil 60 is connected between line 50 and condenser 28 and has in parallel therewith a tuning condenser 62 for tuning the output circuit of the oscillator. In this case, also, a small compensating condenser 64 is connected in parallel with the main tuning condenser 62 and has in series therewith a small loading resistor 66 whose opposite terminal is connected back to line 50. An inductance coil 68 is connected to the lower extremity of the tuned circuit consisting of inductor 60 and tuning condenser 62 and has its opposite terminal connected to a current indicating device or a milliameter 70.

Line 40, the output of the voltage supply filter, is also connected to limiting resistor 72, which is in turn connected to the opposite terminal of the milliameter 70. A condenser 74 is connected between the meter and ground. This point is also connected through a variable resistance 76 and a limiting resistance 78 to the output of a rectifier bridge 80, the opposite terminal of which is connected through line 82 back to the milliameter 70. A condenser 84 is connected across lines 82 and 86. The input to the rectifier bridge is through lines 88 and 90 which are fed from a small secondary coil 92 on a small transformer. The primary coils 96 of this and 94 of the main transformer are fed by suitable 110 volt input through lines 98 and 100. A second secondary coil 102 of the main transformer has its center tap grounded through line 104 and has its two outside terminals connected through line 106 and line 108 to electrodes 110 and 112, respectively, of a full-wave rectifier tube 114, electrode 116 of which is connected through line 118 to the filter system 42, 44, 46, previously described. It will be noted also that the input and output tuned circuits for the oscillator are commonly actuated as shown by the dot-and-dash line connecting the two and are designed to track while being used to vary the oscillator frequency. The small compensating condenser 64, which is ganged with the tuning control, is adjusted so that the oscillator plate current without external load is nearly constant over its frequency range.

All of the electrical system is, of course, enclosed within a casing indicated generally at 120 in Figure 1. The milliameter 70 is shown as mounted on the front panel and a common dial 124 is also shown thereon which controls the tuning of the two condensers 16 and 62. The line 54 of Figure 3 is enclosed within a protected flexible cable 126 and leads to the holder 56 which supports the crystal. This holder, best shown in Figure 2, comprises a long cylindrical metallic conductive casing 128 grounded through screws 152 to the cable shield 126 having at its lower extremity three projections 130 for holding the base 132 up from the surface of a part to be tested and having a long central opening 134 throughout the main length of the housing which has an internal flange 136 near the lower end of said central opening.

The crystal 58 is rigidly secured to a circular disc 138 of insulating material such as Bakelite which has an enlarged external portion 140 adapted to engage the flange 136 and prevent the passage of this member entirely through the opening. Disc 138 also has a central opening 142 therein which is adapted to provide space for the coiled end 144 of the conductor which contacts an electrode on the upper surface of the crystal and acts as a spring to tend to eject the Bakelite member 138 from the opening and at the same time conduct current from the incoming line 54 to the crystal. The conductor 54 for the high frequency currents is supported within a cable formed of shielding outer conductor 146 within which are a series of insulated beads 148 to maintain the conductor 54 within the central portion thereof. A second tubular insulator 150 supports the end of the cable 126 and is itself maintained within the outer housing 128 by suitable grounding set screws 152.

Crystals are most sensitive to thickness vibrations near or somewhat lower in frequency than their own thickness resonant frequency. Since the crystals' own resonant frequency may introduce confusion, it is chosen outside the oscillator range being used and it is desirable to change crystals when changing ranges. It is then only necessary to withdraw the set screws, take out the inner section including the member 150, allow the Bakelite disc holding the crystal 58 to be withdrawn from the upper portion of the holder and insert another Bakelite disc having the crystal of proper characteristics. When this holder is applied to the upper surface of a sheet of metal, such as 154, whose thickness it is desired to ascertain, through the three point suspension or projections 130 it will accommodate itself to almost any surface, the crystal is forced down into as flat contact as possible with the upper surface of the sheet 154 by the resiliency of the coiled portion 144. This places a certain load thereon and is sufficient to cause satisfactory contact between the two. In order to obtain good coupling, the crystal is first dipped in oil which then forms a film between the crystal and the work, aiding in the transfer of motion at all points.

In operation, therefore, the device is actuated by the fact that the electrical characteristics of certain mechanically loaded members change with the mechanical loading. This might be the impedance of a coil which would change as the stress in an associated part of its magnetic circuit was varied, or an impedance change in a condenser due to a change in mechanical stress or deformation of the dielectric, any of these changes being induced by a factor depending on the frequency or frequencies and amplitude of resonance of the measured part. If a wave whose length in the material being measured is equal to twice the thickness of the member being measured is applied by means of a transducer to the member, the same will vibrate in resonance. The transducer is therefore mechanically coupled to the vibrating member, the reacting forces between the two will change and this change will affect the electrical characteristics of the transducer and may be used to indicate this resonance point. In the present instance a piezoelectric crystal is shown, but this is only illustrative and any one of a number of other devices having the characteristics above pointed out may be used within the scope of my invention.

The operator first dips the crystal in oil or other suitable liquid and applies the holder to the surface. The crystal contacts the surface and is pressed thereagainst to the desired degree. Now by applying alternating voltage to the crystal, the same will be forced to vibrate at the frequency of the voltage and this vibration will be mechanically coupled through the oil film to the member being tested, forcing it to vibrate. If the proper frequency is applied to this sheet 154 so that the thickness thereof is equal to one-half wave length or integral multiples thereof, then resonance can be set up in this sheet and the body will vibrate freely with relatively large mechanical amplitude compared to the off-resonance or forced vibrations. The operator therefore slowly changes the frequency of the applied voltage by turning the oscillator dial 124 slowly through the range to try to impress this frequency on the crystal and work. When this work resonance point is reached, the mechanical power loading on the quartz crystal 58 will be substantially increased and its electrical characteristics changed so that the power output of the circuit as measured by the plate current is sharply increased.

If, therefore, there is provided in this circuit some means for closely observing the power output or loading and this resonance point checked as the frequency of the oscillator is varied, then by knowing the frequency at this point the thickness of the material can be found. The resonance formula for steel for ascertaining the thickness is:

$$f = \frac{128000}{t}$$

where $f$ is the frequency in cycles per second, and $t$ is the thickness of the sheet in inches.

Through this formula we may calibrate the dial 156 for steel thickness, or by similar formula for any other material (solid, liquid or gas) and/or mode at resonance, rather than oscillator frequency, or the dial may be calibrated empirically by locating certain points through using known thicknesses of material for the same.

With the above description in mind, it will be seen that if there are any variations in the no-load plate current as the tuner is swung over the band, these variations would tend to give false indications to the operator when the crystal was in test position. It is therefore very essential to use such care in designing the oscillator circuit that there will be as little variation as possible. In order to overcome this variation deficiency, I have provided a compensating condenser shown at 64 in Figure 3 which is in reality a loaded plate attached to the condenser and by adjusting the loading the no-load plate current is made initially constant throughout the band.

It may also be desirable to balance to zero or some other index point the current flowing when the device has been applied to a sheet before tuning begins and in order to so set the milliameter 70 to such a desired figure, a biasing or opposing current is supplied which may be adjusted by a small rheostat 76 within the casing 120. This current is supplied from the main source through the bridge rectifier 80. When now the operator holding the crystal in close contact with the sheet and the resistor 76 so set that the milliameter points to zero, the dial is swung over the range slowly and the point at which the milliameter gives a sudden motion upward indicating a peak current is that of the frequency of resonance of the member. Then by either applying the formula or reading directly from the dial, the exact thickness of the member can be determined.

In some instances it may be advisable to utilize other connections for the milliameter instead of those shown in Figure 3 to simplify the system and Figures 4 and 5 show two such modified forms of connections. In Figure 4 the output of the supply filter 42, 44, 46 is applied to one end of a bleed resistor 158, the opposite end of which is grounded, the milliameter 70 in this instance being connected to an intermediate point of this resistance through line 160, the opposite terminal being connected through line 162 to a further resistor 164 in series with the coil 68 of Figure 3. A variable resistance 166 or rheostat is connected between line 162 and the filter. It will be seen that these elements form a bridge circuit in which the input is across the two parts of the resistor 158 and the meter is across the bridge. Thus by adjusting this rheostat, the bridge may be balanced and the milliameter adjusted to its zero or indexed position.

A further modification is shown in Figure 5 in which the output from the full-wave rectifier 114 is connected through filter 46, 42, 44, to line 168 and thence to one terminal of the milliameter 70. The opposite terminal of the milliameter 70 is connected through line 170 to the plate 172 of an amplifier tube, the grid 174 of which is connected through line 176 to the coil 68 of Figure 3. A resistor 178 is connected between this coil, 176 and the milliameter. The cathode 180 of the amplifier tube or triode is connected through line 182 to a variable tap 184 on a resistor 186 connected between line 168 and ground. Here, again, a bridge circuit is formed, the resistors 178 and 186 forming arms thereof and the oscillator tube plate resistance a further arm. The amplifier tube grid and cathode are connected to the bridge output and its plate voltage obtained from the power supply by connection to the top of the bridge. The milliameter is connected in the amplifier tube plate circuit and the bridge is balanced by movement of the tap 184 on resistor 186 to give the proper index. Any unbalance caused by a variation in the voltage upon the grid 174 will cause the plate current to vary and a reading will be obtained on the meter 70.

In all these instances any variation in the voltage supply is compensated for inasmuch as the biasing voltage is changed in the same degree as the voltage to the oscillator and therefore does not affect the readings.

In the above discussion, the work has been described as a homogeneous sheet in which the standing wave is set up by the transducer. If two pieces have been bonded together, they appear to the measuring means as a single part if the bond is satisfactory. However, if the bond at a particular point is not good and a small spacing between the pieces occurs, then the standing wave is set up in only that part between the transducer and the void or opening and the reading will be of this distance. Thus a change from a thickness reading of the composite body to a fractional distance will indicate at once a poor bond or fault in the work.

So far the discussion has dealt only with the location of the resonance point, but there is utility in measuring the amplitude of the output at the resonance point as well. If the tuning dial is turned to a given thickness and the transducer brought into contact with a series of similar parts in succession which are all presumed to be of the same thickness, then a variation in the amplitude of the resonance peak as indicated on the meter may indicate a slight variation in the character of the material and limits may be set up to cause rejection of parts through this inspection.

These are only a few of the many uses in which the above system may be employed and are therefore to be considered only as illustrative of applicant's broad invention. It will therefore be obvious that I have provided a system capable of measuring, sorting or studying parts by using supersonic vibrations.

I claim:

1. In measuring means, an oscillator tunable over a predetermined band, a vibratable crystal connected to the oscillator output and capable of vibrating to the frequencies generated by the oscillator, a source of power, D. C. current indicating means to measure the oscillator plate input and means interconnecting said source and said indicating means so that fluctuations in supply line voltage will be compensated for, said interconnecting means being adjustable to balance the indicating means for initial setting.

2. In measuring means for indicating characteristics of a part, a vibratable crystal capable of vibrating over a predetermined range, a holder, means for insulatably movably mounting the crystal within the holder to firmly contact the part and spring biasing means tending to eject the crystal from the holder.

3. In measuring means for indicating characteristics of a part, a vibratable crystal capable of vibrating over a predetermined range, a holder, means for insulatably movably mounting the crystal within the holder, spring biasing means tending to eject the crystal from the holder to firmly contact the part, current conducting means supported within the holder, said biasing means being connected thereto to serve both to conduct the current to the crystal and to spring bias the latter.

4. In measuring means, a vibratable crystal capable of vibrating over a predetermined range, a holder, means for insulatably movably mounting the crystal within the holder, spring biasing means tending to eject the crystal from the holder, current conducting means supported within the holder, said biasing means being connected thereto to serve both to conduct the current to the crystal and to spring bias the latter, and removable means for retaining the current conducting means in the holder so that it may be removed and crystals exchanged.

5. In measuring means, an oscillator tunable over a predetermined supersonic frequency band, a source of D. C. power, direct current indicating means connected between the source and the oscillator, a vibratable crystal to be pressed against a part to be measured connected to the oscillator output so that it will impress vibrations upon the part and set the same in motion and as the oscillator is tuned over a band the loading on the crystal will vary at resonance of the part which variation will be indicated upon the indicating means.

6. In measuring means, an oscillator tunable over a predetermined band, a vibratable crystal connected to the oscillator output and capable of vibrating at the frequencies generated by the oscillator, a source of power, D. C. current indicating means connected between the source and the oscillator, a rectifier bridge circuit separately connected to the source and the current indicating means to initially set the indicating means and to balance out the effect of fluctuations in voltage of the source.

7. In measuring means, an oscillator for producing power in an output circuit over a predetermined range of frequency, a direct current input circuit connected to said oscillator, current indicating means in said input circuit, variable capacity tuning means in said oscillator circuit, auxiliary capacity means, resistance means in series relation thereto, said auxiliary capacity and resistance being connected in parallel with the tuning capacity, common means for varying both capacity means as the oscillator is tuned over the band so that a variable compensating load is introduced into the circuit so as to maintain the current indication in the input circuit substantially constant at no-load.

8. In a bridge type measuring circuit, a plurality of resistors, one of which is variable, which form a majority of the arms of said bridge, an oscillator tunable over a predetermined band, a vibratable crystal connected in the oscillator output and capable of vibrating at frequencies generated by the oscillator, said oscillator output circuit forming the remaining arm of said bridge, a D. C. current indicating means diagonally connected across the bridge, a D. C. source of power connected across the opposite corners of said bridge so that said indicating means is responsive to changes in impedance of the oscillator output circuit but is relatively unresponsive to changes in voltage of said source, said variable resistance arm of said bridge providing means for setting the current indicating means to a predetermined index.

9. In measuring means for indicating characteristics of a part, a vibratable crystal, insulating mounting means supporting the crystal at its perimeter, a holder, spring biasing means tending to eject the crystal and mounting from the holder so that the crystal may firmly engage a part to be tested.

10. In measuring means, a supersonic oscillator, tuning means for said oscillator, a vibratable crystal connected to said oscillator output, a source of D. C. power, an ammeter connected to the source and to the oscillator to indicate current flow thereto, a dial on said tuning means so that when the crystal is coupled to a part to be tested and the oscillator tuned over its band the variation in load on said crystal at thickness resonance of the part will be indicated by the meter and the reading as shown on the dial will give the thickness of the part.

11. In measuring means, an oscillator for producing power in an output circuit over a predetermined range of frequency, a direct current input circuit connected to said oscillator, current indicating means in said input circuit, variable tuning means in said oscillator circuit, auxiliary means connected in said oscillator circuit for variably resistance loading the oscillator circuit, mechanical means connecting the auxiliary means with the tuning means to vary the resistance loading as a predetermined function of the frequency tuning means so that at any frequency set by the tuning means the oscillator will be loaded to substantially the same direct current input current.

WESLEY S. ERWIN.

REFERENCES CITED

The following references are of record in the file of this patent:

UNITED STATES PATENTS

| Number | Name | Date |
|---|---|---|
| 1,414,077 | Fessenden | Apr. 25, 1922 |
| 1,990,085 | Mudge et al. | Feb. 5, 1935 |
| 2,077,833 | Gieringer | Apr. 20, 1937 |
| 2,105,479 | Hayes | Jan. 18, 1938 |
| 2,164,125 | Sokoloff | June 27, 1939 |
| 2,231,035 | Stevens et al. | Feb. 11, 1941 |
| 2,280,226 | Firestone | Apr. 21, 1942 |

(Other references on following page)

2,431,233

| Number | Name | Date | Number | Name | Date |
|---|---|---|---|---|---|
| 1,450,246 | Cady | Apr. 3, 1923 | 2,168,924 | Dow | Aug. 8, 1939 |
| 1,465,352 | Dobson | Aug. 21, 1923 | 2,205,571 | Markowitz | June 25, 1940 |
| 1,880,425 | Flanders | Oct. 4, 1932 | 2,313,071 | Hodgson | Mar. 9, 1943 |
| 2,178,252 | Forster | Oct. 31, 1939 | 1,545,940 | Cabot | July 14, 1925 |
| 2,188,830 | Clark et al. | Jan. 30, 1940 | 1,743,039 | Kolster | Jan. 7, 1930 |
| 2,198,226 | Peterson | Apr. 23, 1940 | 1,789,369 | Meissner | Jan. 20, 1931 |
| 2,329,321 | Bach | Sept. 14, 1943 | 2,210,303 | Polydoroff | Aug. 6, 1940 |
| 1,844,705 | Trip | Feb. 9, 1932 | 2,294,171 | George | Aug. 25, 1942 |

Certificate of Correction

Patent No. 2,431,233.   November 18, 1947.

WESLEY S. ERWIN

It is hereby certified that error appears in the printed specification of the above numbered patent requiring correction as follows: Column 7, line 19, claim 2, after the word "holder" strike out "to firmly contact the part" and insert the same after "holder" and before the period in line 21; and that the said Letters Patent should be read with this correction therein that the same may conform to the record of the case in the Patent Office.

Signed and sealed this 20th day of January, A. D. 1948.

[SEAL]

THOMAS F. MURPHY,
*Assistant Commissioner of Patents.*